US007567530B2

(12) United States Patent
Lee

(10) Patent No.: US 7,567,530 B2
(45) Date of Patent: Jul. 28, 2009

(54) METHOD OF CONVERTING COMMUNICATION CHANNEL IN MOBILE COMMUNICATION TERMINAL

(75) Inventor: Jae Ho Lee, Bucheon (KR)

(73) Assignee: Pantech Co., Ltd., Seoul (KR)

( * ) Notice: Subject to any disclaimer, the term of this patent is extended or adjusted under 35 U.S.C. 154(b) by 632 days.

(21) Appl. No.: 11/295,202

(22) Filed: Dec. 6, 2005

(65) Prior Publication Data

US 2006/0120330 A1 Jun. 8, 2006

(30) Foreign Application Priority Data

Dec. 6, 2004 (KR) .................. 10-2004-0101883
Dec. 7, 2004 (KR) .................. 10-2004-0102448

(51) Int. Cl.
*H04W 4/00* (2009.01)
(52) U.S. Cl. .................. 370/329; 370/331; 370/341; 455/436; 455/450
(58) Field of Classification Search .............. 370/331, 370/277, 310, 318, 329, 341, 348, 431, 252, 370/253, 332, 333, 465, 338; 455/424, 425, 455/456.5, 456.6, 436, 432.1, 435.1, 450, 455/451, 452.1, 452.2, 454, 455, 13.4, 522, 455/63.1, 69, 561, 127.2, 115.1, 127.1; 330/129, 330/298, 279, 130
See application file for complete search history.

(56) References Cited

U.S. PATENT DOCUMENTS

| 4,353,037 A | * | 10/1982 | Miller ................. 330/298 |
| 5,150,075 A | * | 9/1992 | Hietala et al. ........... 330/279 |
| 5,337,006 A | * | 8/1994 | Miyazaki .............. 330/130 |
| 5,371,473 A | * | 12/1994 | Trinh et al. ............ 330/129 |
| 5,564,086 A | * | 10/1996 | Cygan et al. ............ 455/126 |
| 5,778,308 A | * | 7/1998 | Sroka et al. ............ 455/115.1 |
| 5,789,929 A | * | 8/1998 | Hankui ................. 324/642 |
| 6,525,657 B1 | * | 2/2003 | Wojcik ................. 340/514 |
| 6,710,651 B2 | * | 3/2004 | Forrester ............... 330/129 |
| 6,919,845 B2 | * | 7/2005 | Ozaki et al. ............ 343/703 |
| 7,146,139 B2 | * | 12/2006 | Nevermann ........... 455/115.1 |
| 2004/0176125 A1 | * | 9/2004 | Lee .................... 455/522 |
| 2005/0113103 A1 | * | 5/2005 | Snowden et al. ........ 455/451 |
| 2005/0113125 A1 | * | 5/2005 | Kang ................... 455/522 |
| 2006/0030281 A1 | * | 2/2006 | Brunel et al. ........... 455/127.1 |

FOREIGN PATENT DOCUMENTS

| KR | 1020000049943 | 5/2000 |
| KR | 1020010107013 | 7/2001 |
| KR | 200363952 | 9/2004 |
| KR | 1020040078743 | 9/2004 |
| KR | 1020040094471 | 10/2004 |
| KR | 1020040071553 | 12/2004 |

\* cited by examiner

*Primary Examiner*—Duc Nguyen
*Assistant Examiner*—Charles Chow
(74) *Attorney, Agent, or Firm*—H.C. Park & Associates, PLC

(57) ABSTRACT

Disclosed is a method of converting a communication channel in a mobile communication terminal. According to the invention, the specific absorption rate (SAR) value information according to each of the communication channels are stored and managed in the mobile communication terminal, so that a communication channel having a relatively low SAR can be assigned from a new base station when there occurs a handoff or a call processing for a call incoming/originating is performed. Like this, the newly assigned communication channel is converted into a communication channel of the terminal, thereby minimizing an effect of the electromagnetic wave influencing on the user of the terminal during the communication. In addition, the SAR value information according to each of the communication channels are stored and managed in the mobile communication terminal, so that it is possible to indicate the SAR of the current communication channel of the terminal to the user.

14 Claims, 6 Drawing Sheets

METHOD OF CONVERTING COMMUNICATION CHANNEL IN MOBILE COMMUNICATION TERMINAL

CROSS-REFERENCE TO RELATED APPLICATION

The present application is claiming priority of Korean Patent Applications No. 10-2004-0101883 filed on Dec. 6, 2004, and No. 10-2004-0102448 filed on Dec. 7, 2004, and the contents of which are herein incorporated by reference.

BACKGROUND OF THE INVENTION

1. Field of the Invention

The present invention relates to a method of converting a communication channel of a mobile communication terminal into another communication channel having a relatively low specific absorption rate (SAR), with reference to a SAR of a current communication channel when there occurs a handoff or a call processing for a call incoming/originating is performed in the terminal.

2. Background of the Related Art

In recent years, as electronic and electric devices are rapidly spread, a recommendation for an effect of electromagnetic waves emitted from the devices on a human body is being made.

Regarding this, an emission of electromagnetic waves of a mobile communication terminal is slight compared to general home electronics. However, it is very injurious in that the mobile communication terminal is used while directly contacting to a head part of the human body. Like this, a portion of the electromagnetic wave emitted from the mobile communication terminal is absorbed into the human body, thereby exerting a bad influence on the human body, such as headache or nerve stimulating action.

Further, it is raised that a SAR, which indicates how many electromagnetic waves emitted from a mobile communication terminal are absorbed into the human body, should be disclosed for the mobile communication terminal as well as general home electronics. With regard to this, some manufacturing companies of the mobile communication terminal indicate an average of the SARs on a label of the terminal or disclose the average through a web site thereof.

In the mean time, it has been suggested a structure of a mobile communication terminal capable of interrupting an emission of electromagnetic waves, regarding controversy over the harmfulness of the electromagnetic waves emitted from the mobile communication terminal. For example, it is suggested a technology of protruding an upper part of a front case of a mobile communication terminal to be spaced from a printed circuit board (PCB) or mounting an antenna obliquely from a rear surface part so as to keep the antenna at a distance from a user's head. However, as a miniaturization and design of the terminal become important to young generation who is a main customer, there is a limitation in an enough spacing of the PCB and the front case part. In addition, when mounting the antenna obliquely, an angle arrangement thereof is also limited.

As described above, according to the prior method of informing a SAR of a mobile communication terminal, an average of the SARs is simply displayed through a web site of a manufacturing company or a label of the terminal. In other words, there is no method of informing the SARs which have different value according to used communication channels in real transmitting/receiving environments of the terminal. In addition, the methods of reducing the SAR in the mobile communication terminal have many limitations in mechanical realizations. Accordingly, users are defenselessly exposed to the electromagnetic waves emitted from the mobile communication terminal in a real communication environment, so that a harmful effect due to the electromagnetic waves influences on the human body.

SUMMARY OF THE INVENTION

Accordingly, the present invention has been made to solve the above-mentioned problems occurring in the prior art. The object of the present invention is to provide a method of converting a communication channel of a mobile communication terminal into another communication channel having a low specific absorption rate (SAR) with reference to a SAR of a current communication channel when there occurs a handoff or a call processing is performed, so as to reduce the SAR emitted from the mobile communication terminal.

Another object of the invention is to provide a method of informing a user of a mobile communication terminal of a SAR of a current communication channel of the terminal in a real time.

In order to accomplish the objects, according to an embodiment of the invention, there is provided a method of converting a communication channel in a mobile communication terminal comprising steps of SAR value information according to each of communication channels into an internal memory of the terminal and setting a reference SAR value to manage the values; checking whether there occurs a handoff requiring a communication channel conversion while performing a communication with the mobile communication terminal having a communication channel assigned thereto; and receiving a new communication channel having a low SAR assigned from a new base station to perform the handoff and converting the communication channel to provide a communication service, when there occurs the handoff requiring the communication channel conversion.

In order to achieve the above objects, according to another embodiment of the invention, there is provided a method of converting a communication channel in a mobile communication terminal comprising steps of storing SAR value information according to each of communication channels into an internal memory of the terminal and setting a reference SAR value to manage the values; when the mobile communication terminal is switched into a call processing mode for a call incoming/originating and receives a communication channel assignment message, checking a currently assigned communication channel by using information contained in the assignment message; extracting SAR value information corresponding to the checked communication channel currently assigned from the internal memory of the terminal and comparing the extracted information with the reference SAR value; and as a result of the comparison, when the SAR value of the currently assigned communication channel is higher than the reference SAR value, receiving a newly assigned communication channel having a low SAR among the receptible communication channels to provide a communication service through the newly assigned communication channel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1A:
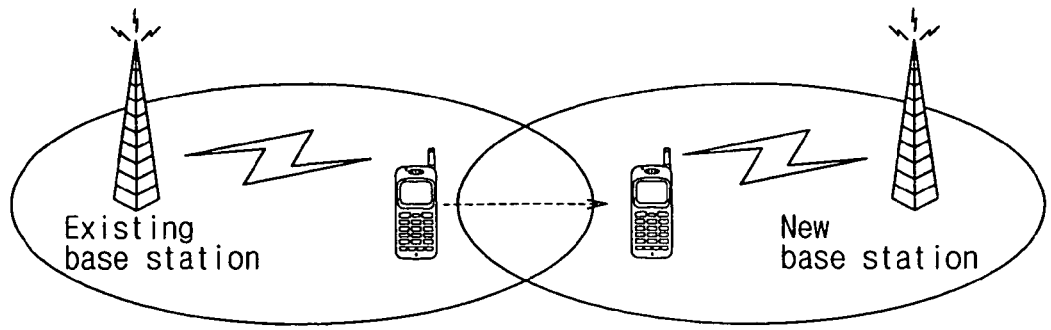
FIG. 1A is a view for illustrating a soft handoff in a mobile communication terminal.
Figure 1B:
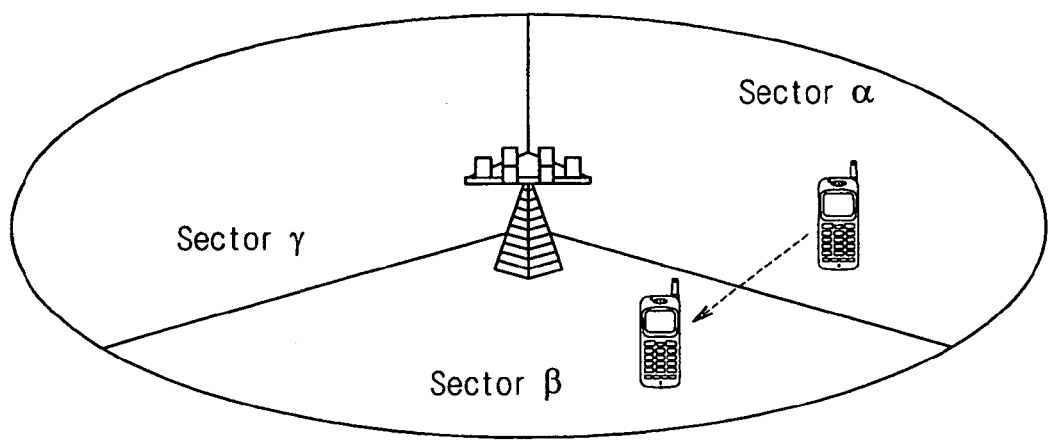
FIG. 1B is a view for illustrating a softer handoff in a mobile communication terminal.
Figure 1C:
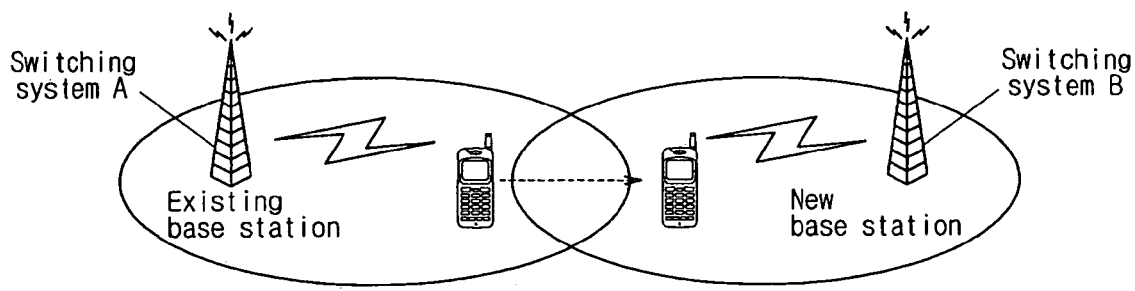
FIG. 1C is a view for illustrating a hard handoff in a mobile communication terminal.

FIGS. 1A, 1B and 1C are views for illustrating a kind of a handoffs in a mobile communication terminal. A kind of handoffs in a mobile communication terminal will be explained with reference to FIG. 1, prior to describing a method of converting a communication channel in the mobile communication terminal according to the invention.

In a mobile communication, a handoff is meant by automatically converting a communication channel currently assigned, when moving from a cell (base station or sector) to another cell (base station or sector). As kinds of the handoff, there are a soft handoff, a softer handoff and a hard handoff.

The soft handoff is a handoff performed between base stations or sectors belonging to a same frequency, a same frame offset and a same switching system, as shown in FIG. 1A. It is a mode supporting a new communication channel while maintaining an existing communication channel as it is.

The softer handoff is a handoff performed between sectors in a same base station, as shown in FIG. 1B. It is a mode connecting a communication channel in a same manner as the soft handoff when moving from any sector (α) area to another sector (β) area while performing a communication in a same base station.

There are two modes of the hard handoff. As shown in FIG. 1C, the first mode is such that when a mobile communication terminal, which is performing a communication in a base station area belonging to any switching system (A), is moved to a new base station belonging to another switching system (B), the terminal is connected to another frequency communication channel of the new base station or a new communication channel having a frame offset different from each other. The second mode is a handoff mode in case of that when a mobile communication terminal is moved from any base station to another new base station, all communication channels of the new base station are used and thus other communication channels different from the communication channels connected to the existing base station should be connected. The hard handoff mainly occurs in a downtown boundary and an inter-carrier handoff area, wherein the number of frequencies (FA) used by neighboring base stations are different from each other.

Figure 2:
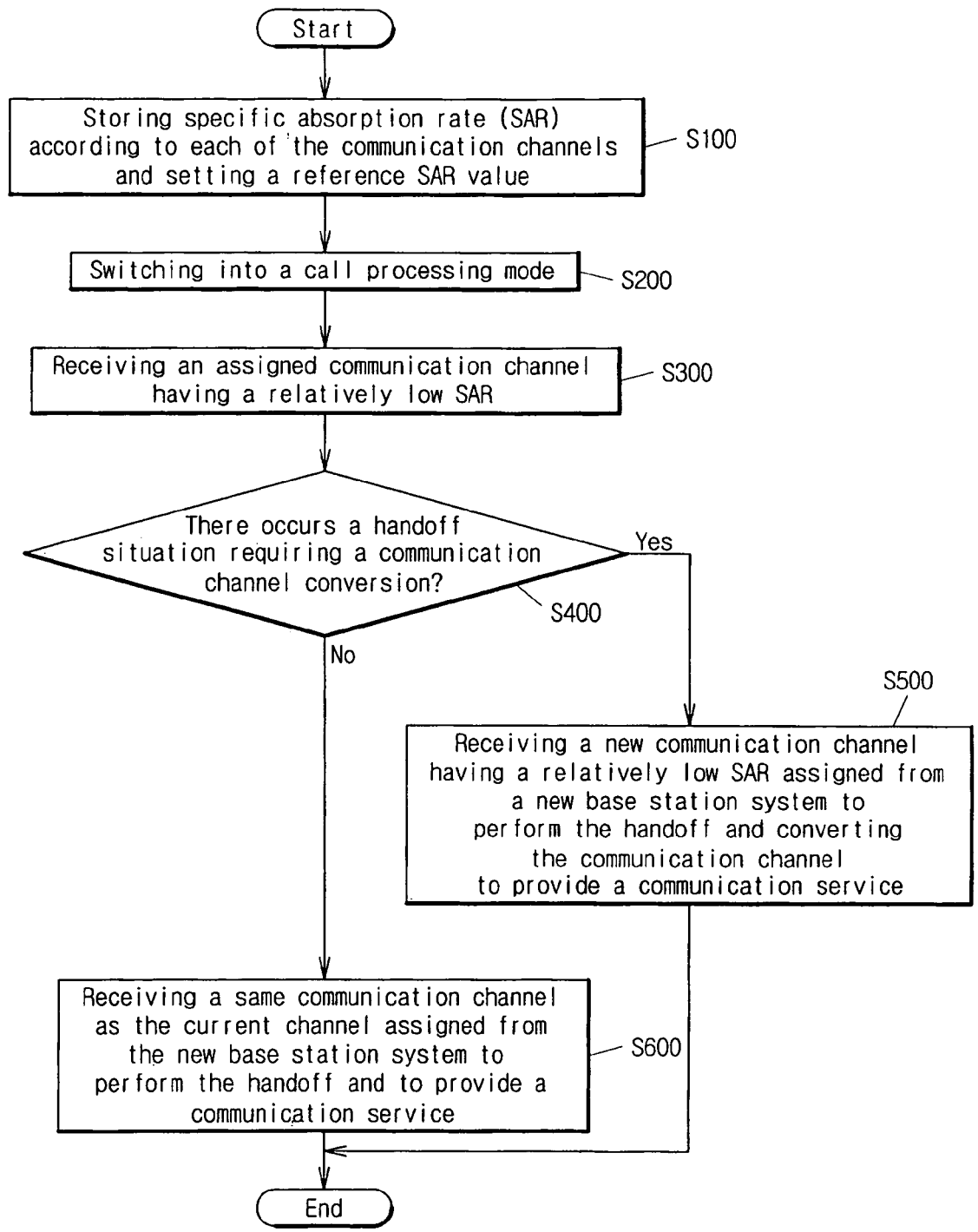
FIG. 2 is a flow chart showing a process of converting a communication channel in a mobile communication terminal according to an embodiment of the invention.

Hereinafter, a method of converting a communication channel in a mobile communication terminal according to an embodiment of the invention will be described with reference to FIG. 2.

Firstly, specific absorption rate (SAR) value information stored in an internal memory of a mobile communication terminal according to the invention is measured at a development or manufacturing stage for each of mobile communication terminals made by each of manufacturing companies, considering a ground, a case and a plated surface, etc. After the SAR values of all communication channels are measured considering the above matters, the SAR value information obtained according to each of the communication channels are stored in the internal memory of the terminal. In addition, a reference SAR value for comparison with a SAR value of a communication channel received from a base station is stored in the internal memory (S100).

In this case, the reason to measure the SAR values of each communication channels for each of the terminals of each manufacturing companies is because the SAR may become also different by an electric field strength. For example, when a SAR value of a specific mobile communication terminal of an "A" company is measured to be '1.5' in a No. 1 communication channel, the SAR of a mobile communication terminal of a "B" company is not necessarily measured to be '1.5' in the same channel. That is, the SAR value of the terminal made by the B company may be higher or lower than '1.5.'

In the mean time, the reference SAR value is preferably lower than an average of SAR values for all communication channels.

Like this, under the state that the SAR value information and the reference SAR value information for each communication channels are stored and managed in the internal memory of the mobile communication terminal, when the terminal is switched into a call processing mode for a call incoming or originating (S200), a controller (not shown) of the terminal receives a communication channel having a relatively low SAR among receptible communication channels from a base station, and then provides a communication service by using the assigned channel as a communication channel (S300).

After that, when a user of the terminal moves from an area under control of the base station to another area under control of a new base station while performing a communication and a pilot signal intensity is changed below a predetermined intensity, the controller of the terminal checks whether there occurs a handoff situation requiring a conversion of the communication channel being currently used due to the change of the pilot signal intensity (S400).

As a result of the check in the step of S400, if it is a handoff requiring a conversion of the communication channel (i.e., hard handoff), the controller of the terminal performs a conversion operation of the communication channel in conjunction with the new base station. In other words, the controller receives a new communication channel having a relatively low SAR among receptible communication channels from the new base station to perform a handoff, and then converts the assigned communication channel into a new communication channel to continuously provide a communication service (S500).

However, as the check result in the step of S400, if it is a handoff not requiring a conversion of the communication channel (i.e., soft handoff or softer handoff), it means that the communication is performed by receiving a same communication channel from a new base station under state that the communication channel with the existing base station is maintained as it is. Accordingly, the controller of the terminal receives a same communication channel as the communication channel being currently used from the new base station to perform a handoff and continues to provide a communication service through the assigned communication channel (S600).

Figure 3:
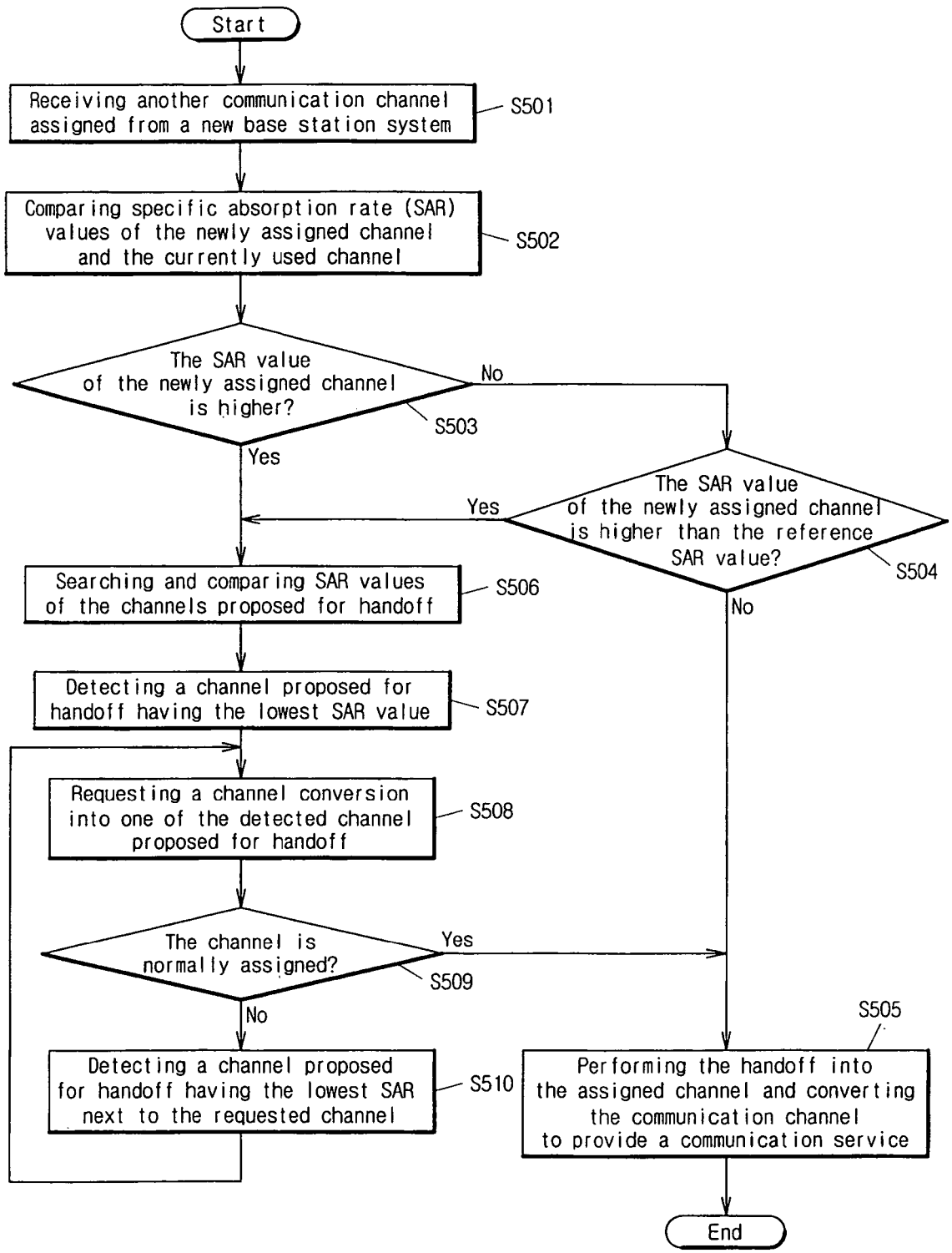
FIG. 3 is a flow chart showing a process of converting the communication channel into a communication channel having a relatively low specific absorption rate (SAR) when there occurs a handoff requiring a conversion of the communication channel in FIG. 2.

In the step of S500, the process of converting the communication channel into a communication channel having a relatively low SAR will be specifically explained with reference to FIG. 3. FIG. 3 is a flow chart showing a process of converting the communication channel into a communication channel having a relatively low SAR when there occurs a handoff requiring a conversion of the communication channel in FIG. 2.

Firstly, when there occurs a handoff requiring a conversion of the communication channel, the controller of the terminal receives a communication channel that is other than the communication channel being currently used from a new base station controlling an area into which the terminal is moved (S501).

Then, the controller of the terminal extracts SAR value information of the assigned communication channel and SAR value information of the communication channel being currently used from the internal memory of the terminal and compares the two SAR values (S502). In this case, it checks whether the SAR value of the newly assigned communication channel is higher than that of the communication channel being currently used (S503).

As a result of the check in the step of S503, if the SAR value of the newly assigned communication channel is not higher than that of the communication channel being currently used, the controller of the terminal compares the SAR value of the newly assigned communication channel with the reference SAR value (S504).

As a result of the check in the step of S504, if the SAR value of the newly assigned communication channel is not higher than the reference SAR value, it means that the SAR of the newly assigned communication channel is relatively low. Accordingly, the controller of the terminal performs a handoff into the newly assigned communication channel and converts the assigned communication channel into a communication channel to continuously provide the communication service (S505).

However, as the check result in the step of S503, if the SAR value of the newly assigned communication channel is higher than that of the communication channel being currently used, or as the comparison result in the step of S504, if the SAR value of the newly assigned communication channel is higher than the reference SAR value, it means that the SAR of the newly assigned communication channel is relatively high. In this case, the controller of the terminal searches the SAR information for the receptible communication channels, i.e., communication channels proposed for handoff, and compares them with each other (S506), thereby detecting a communication channel proposed for handoff having the lowest SAR value (S507). At this time, the communication channel, which has been already assigned, is excluded from the communication channels proposed for handoff.

Like this, after detecting the communication channel proposed for handoff having the lowest SAR value, the controller requests an assignment of the detected communication channel proposed for handoff to the new base station through an access channel (S508).

After that, the controller of the terminal checks whether there is an response to the request of the communication channel conversion or not, i.e., whether the communication channel, which is requested by the mobile communication terminal, is normally assigned from the new base station (S509). As a result of the check in the step of S509, if the requested communication channel is normally assigned, the controller performs a handoff into the assigned communication channel and converts the communication channel into a communication channel to continuously provide a communication service (S505).

However, as the check result in the step of S509, if the communication channel, which is requested by the mobile communication terminal, is not normally assigned from the new base station, the controller detects information about a communication channel proposed for handoff having the lowest SAR next to the requested communication channel among the communication channels proposed for handoff under control of the controller (S510). Then, it repeatedly performs the operation of requesting a communication channel conversion into the detected communication channel to the new base station. By repeatedly performing the operation, the controller receives a communication channel having the lowest SAR among the communication channels which can be assigned from the new base station to perform the handoff, and converts the assigned communication channel into a communication channel to continuously provide a corresponding communication service.

In the mean time, as described with reference to FIG. 2, the mobile communication terminal according to the invention receives a communication channel having a relatively low SAR to provide a communication service when performing a call processing with the base station as well as when there occurs a handoff (S300).

Figure 4:
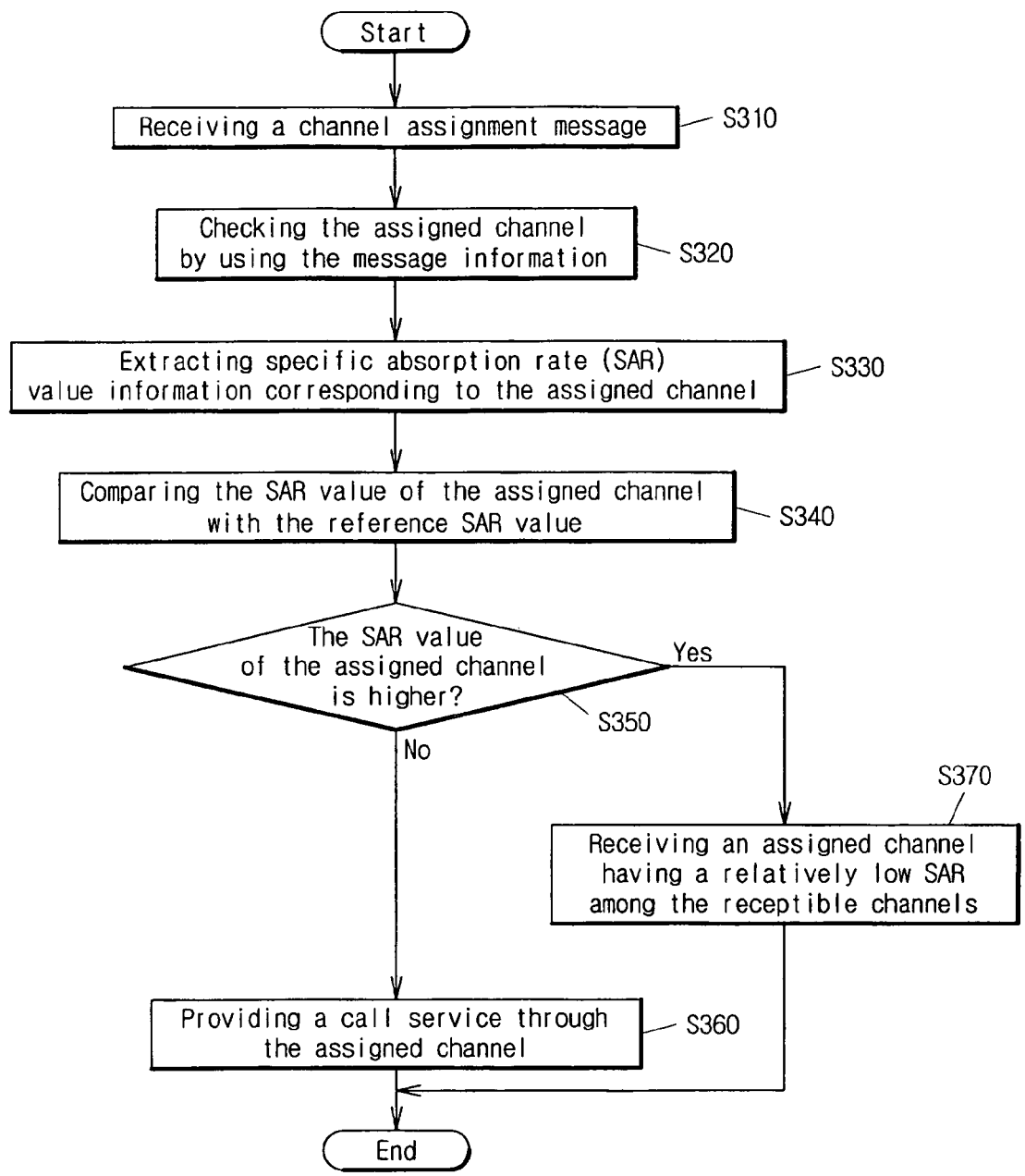
FIG. 4 is a flow chart illustrating a communication channel conversion process in a mobile communication terminal according to an embodiment of the invention.

A process of assigning a communication channel in the step of S300 will be specifically described with reference to FIG. 4. FIG. 4 is a flow chart illustrating a communication channel conversion process when a mobile communication terminal is converted into a call processing mode.

When the mobile communication terminal is converted into a call processing mode for a call incoming/originating and thus a communication channel assignment message is received (S310), the controller of the terminal checks a currently assigned communication channel by using information of a communication channel frequency and a Walsh code contained in the message (S320). Then, the controller extracts SAR value information corresponding to the assigned communication channel from the internal memory (S330). The controller compares the extracted SAR value of the assigned communication channel with a preset reference SAR value (S340). At this time, it determines whether the SAR value of the currently assigned communication channel is higher than the preset reference SAR value or not (S350).

As a result of the determination in the step of S350, if the SAR value of the currently assigned communication channel is not higher than the preset reference SAR value, the controller provides a communication service by using the currently assigned communication channel (S360).

However, as the determination result in the step of S350, if the SAR value of the currently assigned communication channel is higher than the preset reference SAR value, the controller receives a new communication channel having a relatively low SAR among the communication channels which can be received by the mobile communication terminal and provides a communication service by using the assigned communication channel (S370).

Figure 5:
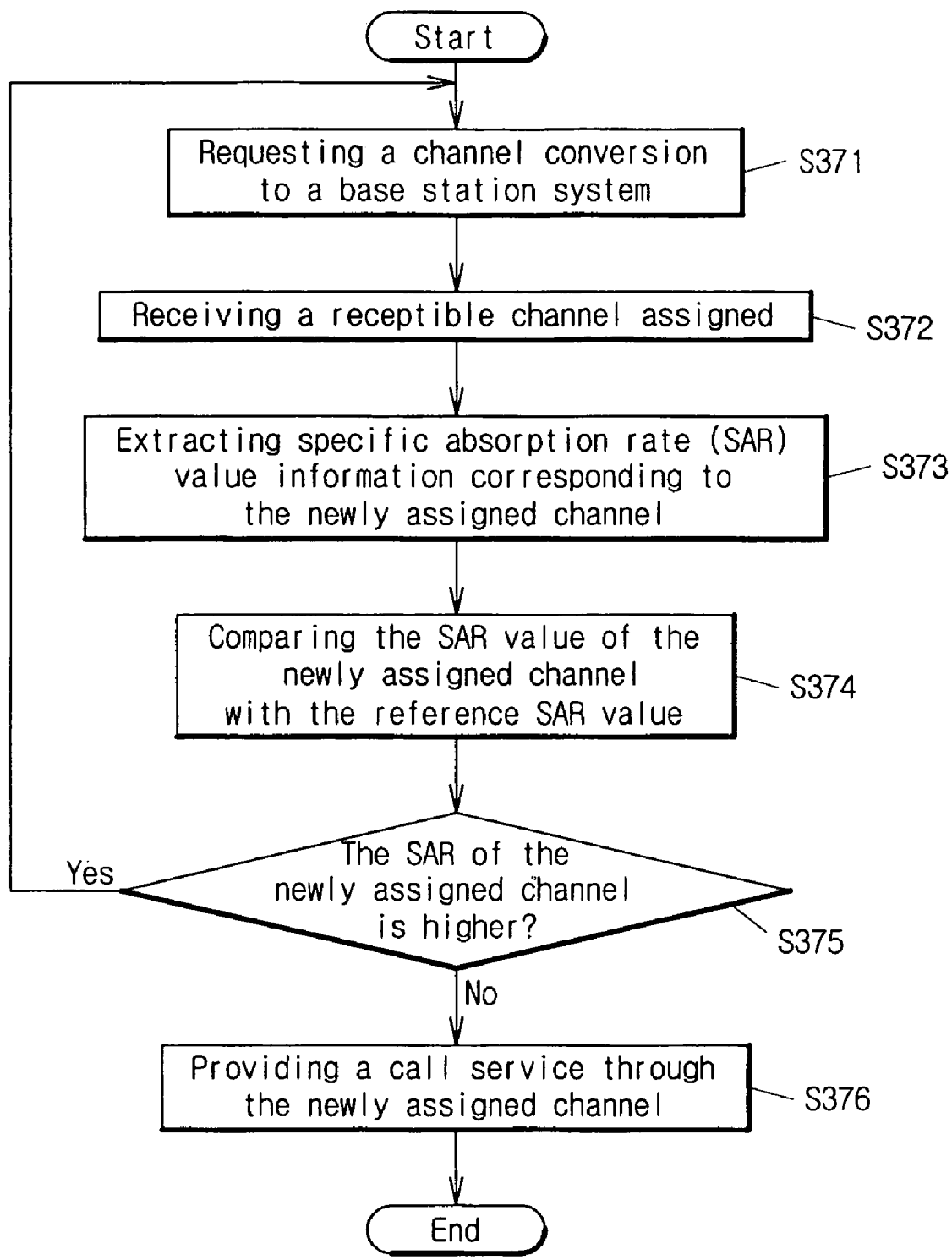
FIG. 5 is a flow chart showing a process of converting a currently assigned communication channel into another communication channel having a low SAR, in FIG. 4.

The process of S370 for converting the currently assigned communication channel into another communication channel having a low SAR will be more specifically described with reference to FIG. 5.

Firstly, the mobile communication terminal receives another receptible communication channel among the communication channels assigned to an area in which the terminal is located, as a new communication channel. For doing so, the controller transmits a message of requesting a communication channel conversion to the base station through the access channel (S371) and receives an assignment message of another communication channel as an answer to the request, so that it receives another communication channel (S372).

The controller checks communication channel information of the newly assigned communication channel by using information of a communication channel frequency and a Walsh code contained in the assignment message, and then extracts SAR value information corresponding to the communication channel from the internal memory (S373).

After that, as described above, the controller compares the SAR value of the newly assigned communication channel with the preset reference SAR value (S374) and checks whether which one of the two values is higher (S375). As the check result in the step of S375, if the SAR value of the newly assigned communication channel is higher than the reference SAR value, the controller again requests a communication channel conversion to the base station so that it receives another communication channel having a relatively low SAR among the receptible communication channels. That is, the controller repeats the procedures of S371 to S375.

Like this, the controller repeatedly performs the process of requesting the communication channel conversion until it receives a new communication channel having a SAR value lower than the reference SAR value from the base station. In addition, in the above embodiment, when the SAR values of all communication channels which the mobile communication terminal can receive among the communication channels assigned to an area in which the terminal is located are higher than the reference SAR value, the controller receives a communication channel having the lowest SAR among the receptible communication channels as a call communication channel to provide a call service.

On the contrary, as the check result in the step of S375, if the SAR value of the newly assigned communication channel is not higher than the reference SAR value, the controller uses the newly assigned communication channel as a call communication channel to provide a call service (S376).

The terminal can be structured to output a warning message or an alarm (or vibration) informing the user of that the SAR value of the currently assigned communication channel is high, when the SAR value of the communication channel assigned from the base station is higher than the preset reference SAR value. The user, who checked that the current SAR value of the mobile communication terminal is high through the warning sign, may try to make a call with an earphone mode or speaker mode so as to minimize an effect of an electromagnetic wave.

Like this, according to the invention, when the SAR value of the currently assigned communication channel is higher than the reference SAR value, it can be structured to receive another communication channel having a low SAR or to output a warning sign from the mobile communication terminal according to a user's choice. In addition, it can be structured such that the communication channel assignment and the warning sign output are simultaneously made.

Figure 6:
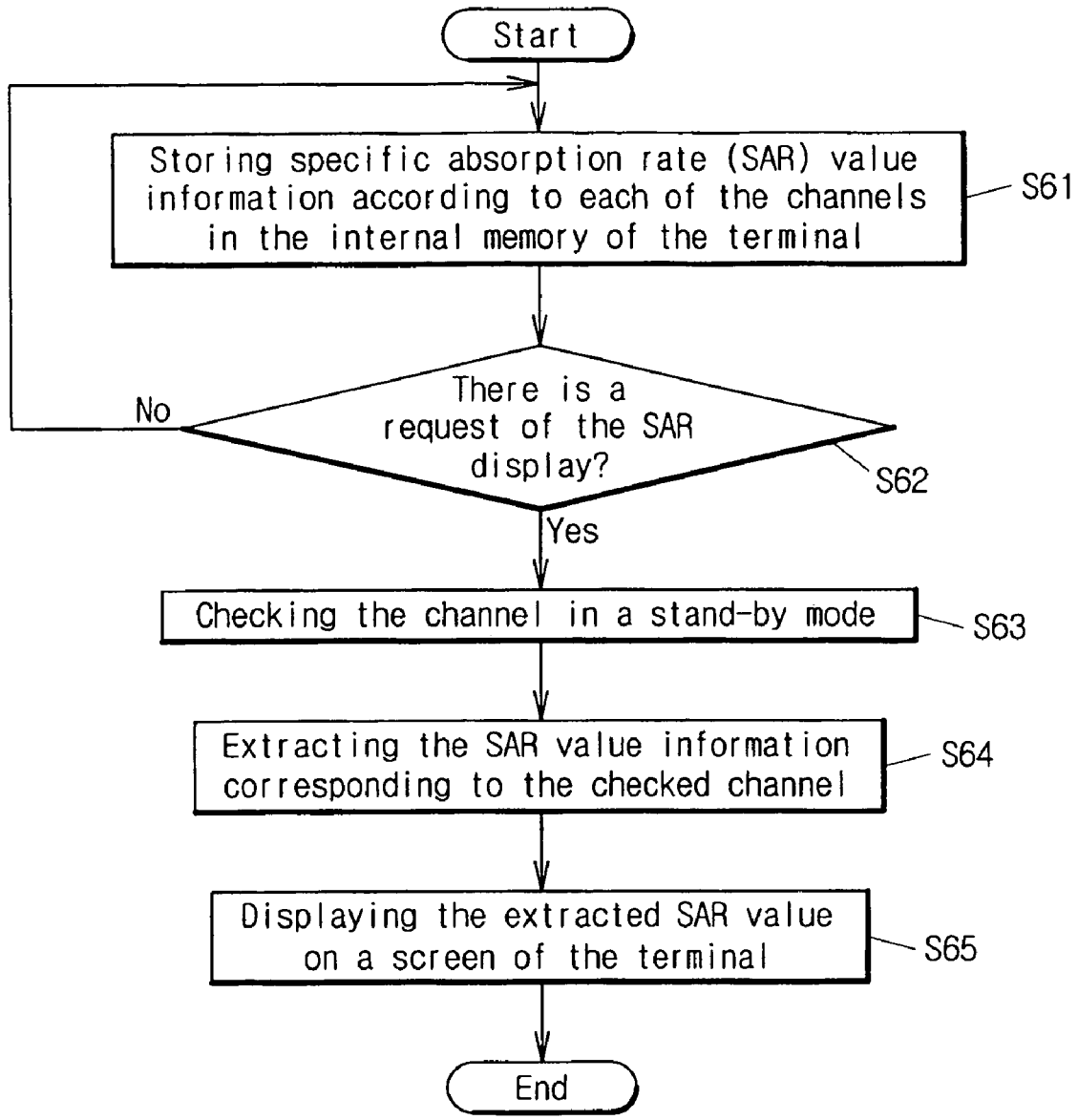
FIG. 6 is a flow chart illustrating a process of displaying a SAR in a mobile communication terminal according to an embodiment of the invention.

In the mean time, the mobile communication terminal according to the invention can be structured to inform the user of a current SAR. FIG. 6 is a flow chart illustrating a SAR displaying process in the mobile communication terminal according to the invention. The SAR displaying process according to the embodiment shown in FIG. 6 will be specifically described as follows.

Firstly, after measuring the SAR values of all communication channels for each mobile communication terminals of each manufacturing companies, considering the terminal's status for ground, case and plated surface, etc., the SAR value information obtained according to each of the communication channels should be stored in the internal memory of the mobile communication terminal (S61).

Under state that the SAR value information according to each of the communication channels are stored in the mobile communication terminal, the controller of the terminal checks whether a user of the terminal is requesting a SAR display (S62). For example, if the user of the terminal requests the SAR display through a key operation or menu selection, the controller recognizes the request of the SAR display.

As a result of the check in the step of S62, if there is the request of the SAR display from the user, the controller of the terminal checks a communication channel in a stand-by mode of the current terminal (S63). Then, the controller extracts the SAR value information corresponding to the checked communication channel from the internal memory (S64) and then displays it on a screen provided in the terminal (S65). At this time, according to another embodiment of the invention, the extracted SAR value information may be outputted as a voice.

The mobile communication terminal according to the invention informs the user of the current SAR of the terminal through the above procedures.

As described above, according to the invention, when there occurs a handoff or when a call processing for call incoming or originating is performed, the communication channel of the mobile communication terminal is converted into a communication channel having a low SAR or a warning sign is outputted, so that it is possible to minimize an effect of an electromagnetic wave influencing on the user. In addition, according to the invention, it is possible to inform the user of the SAR of the current communication channel of the terminal in a real time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of converting a communication channel in a mobile communication terminal comprising steps of:
    storing specific absorption rate (SAR) value information according to each of communication channels into an internal memory of the terminal and setting a reference SAR value;
    checking whether there occurs a handoff requiring a communication channel conversion while performing a communication with the mobile communication terminal; and
    receiving a new communication channel having a low SAR from a new base station to perform the handoff and converting the communication channel to provide a communication service, if there occurs the handoff requiring the communication channel conversion.

2. The method according to claim 1, wherein the SAR value information according to each of communication channels stored in the internal memory of the mobile communication terminal are obtained by measuring for each communication channel of each manufacturing company, considering the terminal's status for ground, case and plated surface.

3. The method according to claim 1, wherein the step of receiving the newly assigned communication channel comprises sub-steps of:
  receiving another communication channel assigned from the new base station;
  comparing a SAR value of the newly assigned communication channel with a SAR value of the communication channel to be currently used and the reference SAR value; and
  when the SAR value of the newly assigned communication channel is not higher than the SAR value of the currently used communication channel and the reference SAR as a result of the comparison, performing the handoff into the newly assigned communication channel and converting the newly assigned communication channel into a communication channel to continuously provide the communication service.

4. The method according to claim 3, wherein if the SAR value of the newly assigned communication channel is higher than that of the currently used communication channel or the reference SAR as the comparison result, comprising sub-steps of:
  searching SAR values of the communication channels proposed for the handoff stored in the internal memory of the terminal and comparing the searched SAR values with each other;
  detecting the communication channels proposed for the handoff having a relatively low SAR sequentially according to the search and comparison, and requesting a communication channel conversion into one of the detected communication channels to the new base station;
  receiving the requested communication channel assigned from the new base station; and
  performing the handoff into the newly assigned communication channel and converting the newly assigned communication channel into a communication channel to continuously provide the communication service.

5. The method according to claim 1, wherein if the mobile communication terminal is switched into a call processing mode for a call incoming/originating and receives a communication channel assignment message, further comprising steps of:
  checking a currently assigned communication channel by using information contained in the assignment message;
  extracting SAR value information corresponding to the checked communication channel currently assigned from the internal memory of the terminal and comparing the extracted information with the reference SAR value; and
  as a result of the comparison, if the SAR value of the currently assigned communication channel is not higher than the reference SAR value, providing the communication service by using the currently assigned communication channel as a communication channel and if the SAR value of the currently assigned communication channel is higher than the reference SAR value, receiving a newly assigned communication channel having a low SAR among the receptible communication channels to provide the communication service through the newly assigned communication channel.

6. The method according to claim 5, wherein in the step of receiving the newly assigned communication channel to provide the communication service, the request of the communication channel conversion to the base station is repeatedly performed until a new communication channel having a SAR value lower than the reference SAR value is assigned.

7. The method according to claim 5, further comprising a step of outputting an alarm or warning message for informing of that the SAR value of the currently assigned communication channel is high, if the SAR value of the currently assigned communication channel is higher than the reference SAR value as the comparison result.

8. The method according to claim 1, further comprising a step of checking a current communication channel, if there is a request of displaying a SAR of the current communication channel of the terminal and then extracting and displaying SAR value information corresponding to the current communication channel from the internal memory.

9. A method of converting a communication channel in a mobile communication terminal comprising steps of:
  storing specific absorption rate (SAR) value information according to each of communication channels into an internal memory of the terminal and setting a reference SAR value;
  if the mobile communication terminal is switched into a call processing mode for a call incoming/originating and receives a communication channel assignment message, checking a currently assigned communication channel by using information contained in the assignment message;
  extracting SAR value information corresponding to the checked communication channel currently assigned from the internal memory of the terminal and comparing the extracted information with the reference SAR value; and
  receiving a newly assigned communication channel having a low SAR among the receptible communication channels to provide a communication service, if the SAR value of the currently assigned communication channel is higher than the reference SAR value as a result of the comparison.

10. The method according to claim 9, wherein the SAR value information according to each of communication channels stored in the internal memory of the mobile communication terminal are obtained by measuring for each communication channel of each manufacturing company, considering the terminal's status for ground, case and plated surface.

11. The method according to claim 9, further comprising a step of providing the communication service using the currently assigned communication channel as a communication channel, if the SAR value of the currently assigned communication channel is not higher than the reference SAR value as the comparison result.

12. The method according to claim 9, wherein in the step of receiving the newly assigned communication channel having the low SAR to provide the communication service, the request of the communication channel conversion to the base station is repeatedly performed until a new communication channel having a SAR value lower than the reference SAR value is assigned.

13. The method according to claim 9, further comprising a step of outputting an alarm or warning message for informing of that the SAR value of the currently assigned communication channel is high, if the SAR value of the currently assigned communication channel is higher than the reference SAR value as the comparison result.

14. The method according to claim 9, further comprising a step of checking a current communication channel if there is a request of displaying a SAR of the current communication channel of the terminal and then extracting and displaying SAR value information corresponding to the current communication channel from the internal memory.

* * * * *